July 20, 1965

H. J. LANGE ETAL 3,195,740

DESTACKER

Filed Jan. 24, 1962

INVENTOR.
HAROLD J. LANGE
GRANT POLLARD
BY Woodhams, Blanchard & Flynn
ATTORNEYS INVENTORS
HAROLD J. LANGE
GRANT POLLARD
BY Woodhams Blanchard & Flynn
ATTORNEYS INVENTORS
HAROLD J. LANGE
GRANT POLLARD
BY Woodhams, Blanchard & Flynn
ATTORNEYS

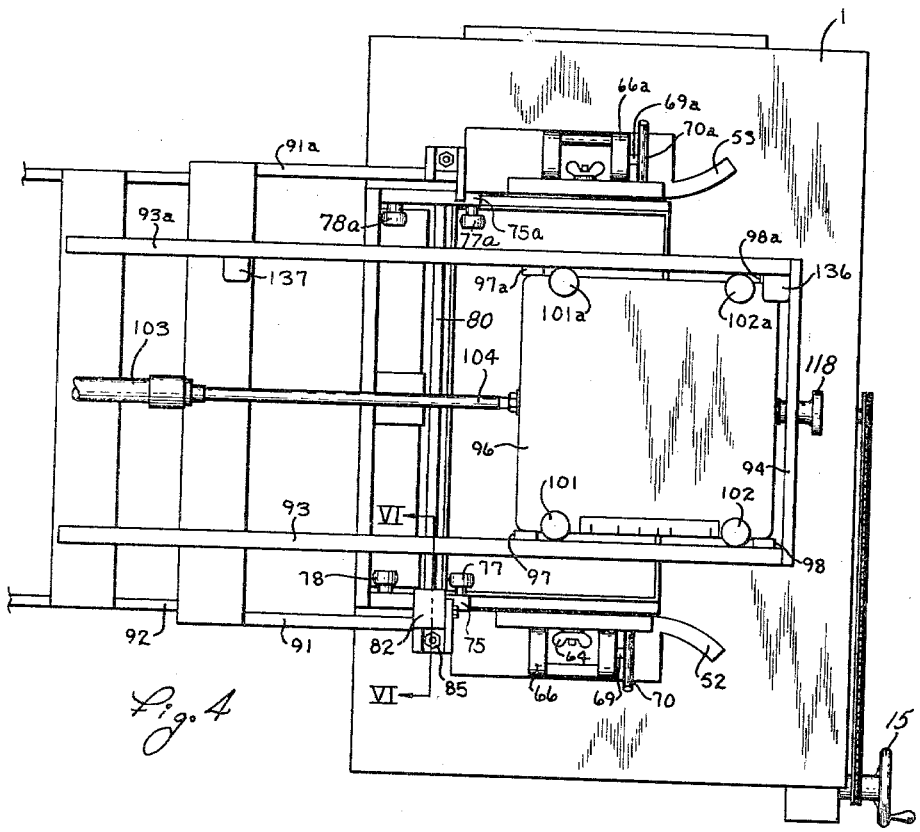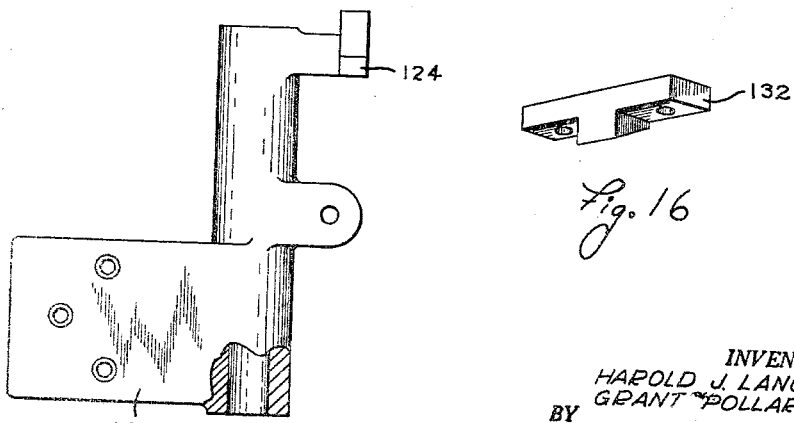

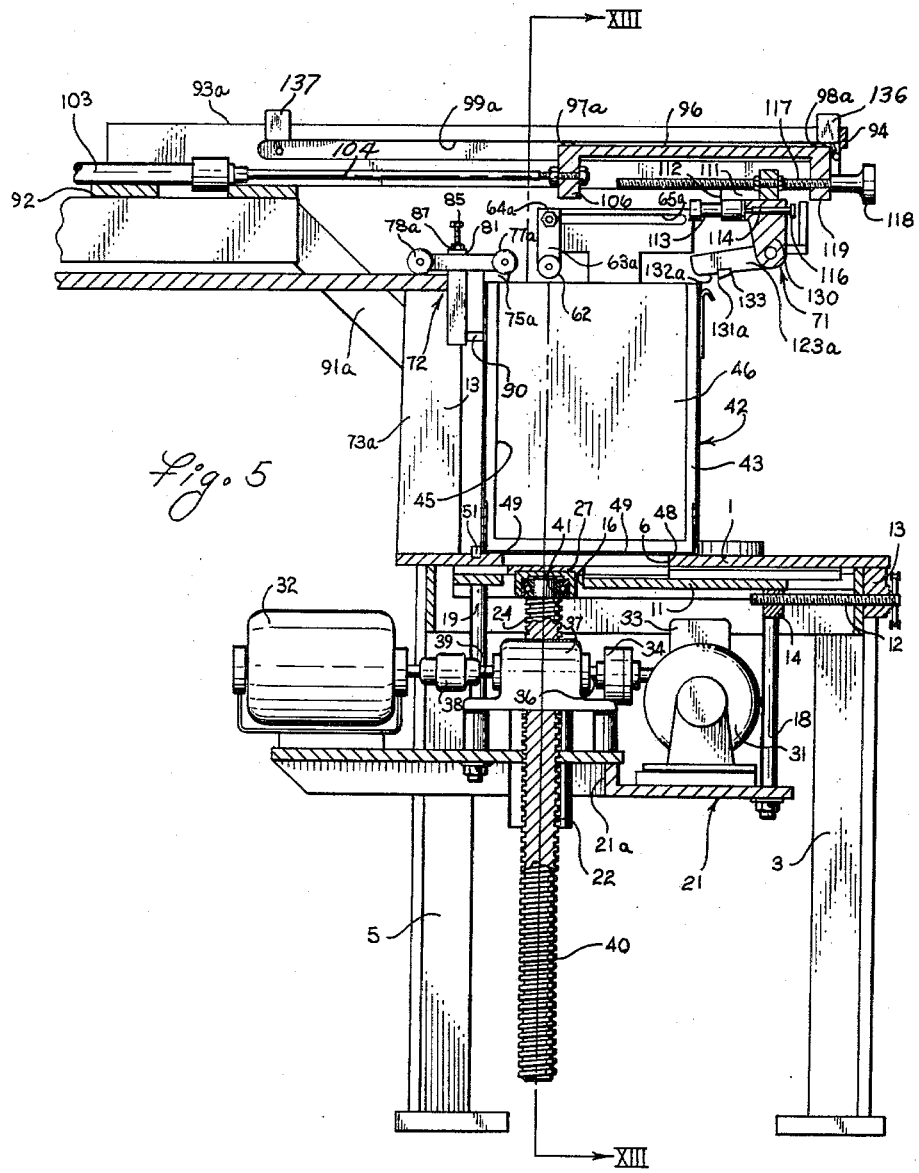

July 20, 1965  H. J. LANGE ETAL  3,195,740
DESTACKER
Filed Jan. 24, 1962  8 Sheets-Sheet 6
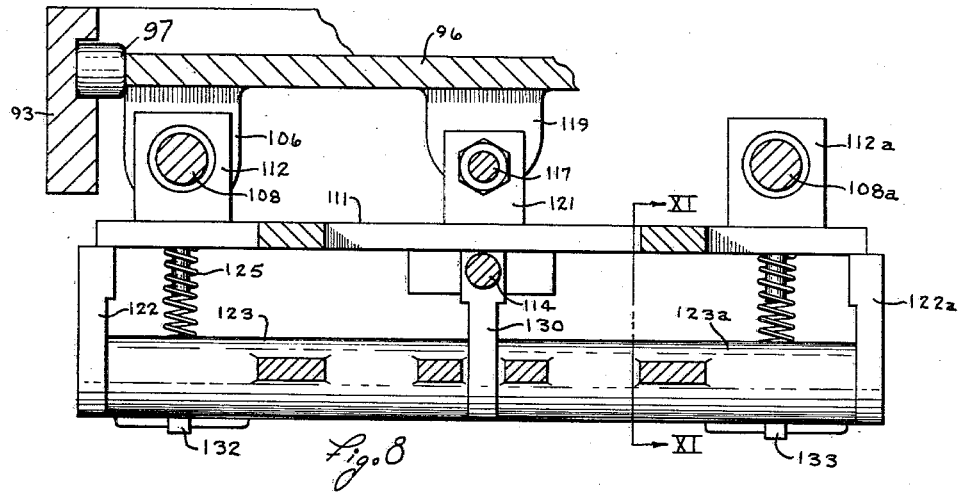
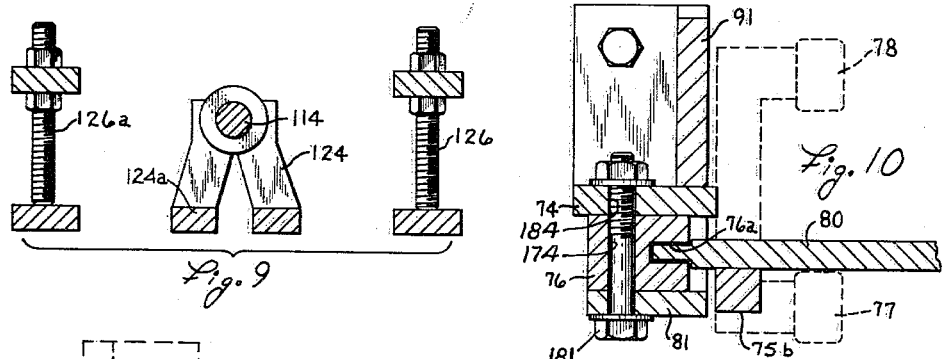
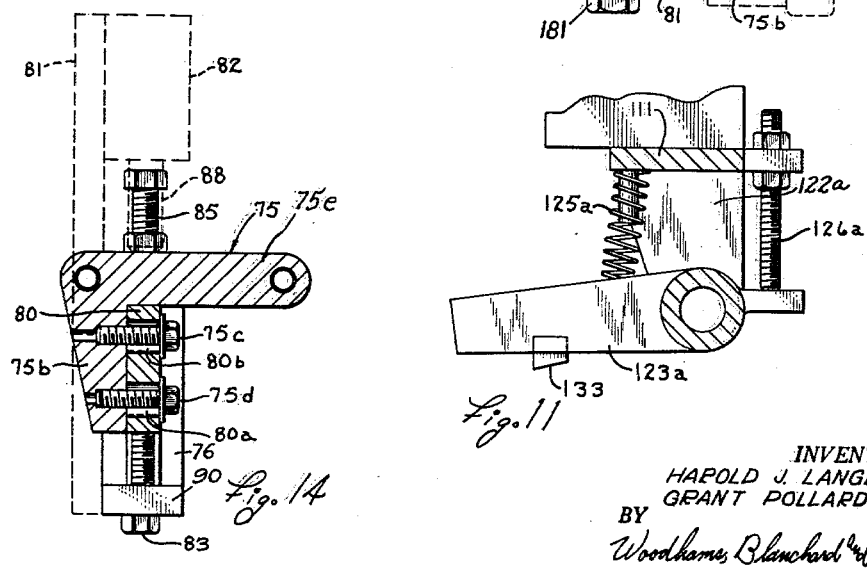
INVENTORS
HAROLD J. LANGE
GRANT POLLARD
BY
Woodhams, Blanchard & Flynn
ATTORNEYS

INVENTORS
HAROLD J. LANGE
GRANT POLLARD
ATTORNEYS

INVENTORS
HAROLD J. LANGE
GRANT POLLARD
BY
ATTORNEYS

3,195,740
DESTACKER

Harold J. Lange, Bay City, Mich., and Grant Pollard, Chicago, Ill., assignors to National Electric Welding Machines Co., Bay City, Mich., a corporation of Michigan
Filed Jan. 24, 1962, Ser. No. 168,480
11 Claims. (Cl. 214—8.5)

This invention relates to material handling means and it relates particularly to means for successively feeding to suitable utilizing means one sheet at a time from a stack containing a plurality of such sheets.

While the present invention may be applied to the feeding of sheets of many different types, both metallic and nonmetallic, it has been particularly developed in connection with the feeding of metallic sheets to a bending and welding machine and accordingly for the purpose of illustrating the invention the following discussion will proceed primarily in connection with such specific application and use. However, it should be clearly understood that such reference is solely for illustrative purposes and constitutes no limitation upon the various uses to which the present invention can be put.

The feeding of thin sheets of material one at a time from a stack thereof to a point of utilization is an old art and one which appears in a wide variety of industrial situations. In the particular instance giving rise to the present invention, the problem involved feeding relatively small, but very smooth, metallic sheets from a stack thereof to a bending and welding machine wherein such sheets were formed into a cylindrical shape, welded into such shape, and subsequently utilized as the frames of explosion-proof electric motors. Because of the possibility of a spark path being provided along a scratch on the motor frame, it is necessary that such sheets be handled in such a manner that no scratches would appear thereon. Further, on open-type motor frames which are not smooth but rather perforated with many holes, elimination of scratching is desirable from an appearance standpoint. Thus, conventional methods of feeding metallic sheets from a stack thereof, which methods usually involved feeding from the bottom of a stack by a reciprocable shuttle, were unacceptable due to the frequent occurrence of scratching effected by the bottom sheet of the stack onto the upper surface of a sheet being fed at a given instance.

In meeting this problem, one early attempt employed the well-known practice of grasping the stack of sheets at opposite sides and lifting same momentarily to relieve the weight thereof from the bottom sheet of the stack. This, however, proved to be unsatisfactory due among other reasons to the difficulty of insuring, since relatively thin sheets are involved, the feeding of only a single sheet from the bottom of the stack at any given time. Other attempts have involved feeding sheets one at a time from the top of the stack by the use of magnetic pickup means. This, however, while avoiding scoring and scratching, did not prove satisfactory due again to the difficulty of insuring the obtaining of only a single sheet, particularly where said sheets were relatively thin. Even with the most careful control of magnetic force feasible, when the force was strong enough to insure effective picking of one sheet under all circumstances, it occasionally picked more than one sheet with the obvious resulting disturbance to the smooth operation of subsequent mechanism. Still further prior attempts have included the use of vacuum pickup means. This, however, is not entirely reliable and it use is impossible on sheets having holes therein.

A further problem appearing in connection with feeding means of the type here in question comes from the fact that the sheets to be handled by a given machine often vary in size from one job to another. For example, referring again to the feeding of housings for explosion-proof electric motors, the housings are often of different lengths to accommodate motors of different sizes even in those situations where the housing blanks are of identical width. Further, the thicknesses of the metal sheets often vary from time to time according to the particular style of motor being manufactured in the given instance. Therefore any device for feeding same must provide for handling sheets of different lengths in the direction of the feeding thereof as well as for handling the sheets of different thicknesses and be accordingly adjustable as the machine is used with one size and thickness of sheet or another. In previously known devices of this general type, such adjustability has been achieved only with some difficulty and at the cost of substantially further complicating the apparatus.

A still further problem lies in the accessibility of the feeding parts of the mechanism, both for observation by the operator during normal operation thereof and for accessibility thereto by maintenance personnel when a malfunction appears. In many types of conventional equipment, particularly those where the shuttle mechanism is at the bottom of the stack, such mechanism is difficult to watch and often cannot be adjusted or repaired without removing the entire stack from the feeding location. Thus malfunctions can often develop without the knowledge of the operator and the first information he has on the subject is when the result of an improper feeding action appears in the subsequent mechanism. This can sometimes be very serious. However, with the feed mechanism at the top of the machine and all readily visible, the operator can better keep track of the operation of the machine and often see and correct a malfunction before it affects the subsequent mechanism with which the feeding machine is being used. Likewise, where a malfunction is detected and needs correction, maintenance personnel can often correct same without unloading the machine and, therefore, do so much more quickly.

Accordingly, the objects of the invention include:

(1) To provide a material feeding device primarily applicable to the feeding of relatively thin stacked sheets of either metallic or nonmetalic character.

(2) To provide apparatus, as aforesaid, which will feed sheets from the top of a stack thereof under such circumstances as to minimize the likelihood of scratching either the upper or lower surfaces of the sheet being fed or an adjacent surface of a sheet still in the stack.

(3) To provide apparatus as aforesaid which is subject to sufficiently positive control of the feeding mechanism that only one sheet at a time will be fed.

(4) To provide apparatus as aforesaid wherein the feed controlling mechanism is all arranged above the stack of material and therefore in plain sight of the operator, whereby to render observation and maintenance of the mechanism easier and more effective than where the feeding and control mechanism is placed below the stack and thereby partially out of sight of the operator.

(5) To provide apparatus as aforesaid in which after the feeding of a sheet the stack will be raised bodily a distance corresponding to the vertical thickness of such sheet whereby to enable a feeding shuttle to reciprocate at all times in a single horizontal plane.

(6) A further object of the invention is to provide apparatus as aforesaid which can be readily adjusted to enable it to handle sheets of a variety of different lengths in the direction of feeding thereof as well as a variety of different thicknesses.

(7) A further object of the invention has been to provide apparatus as aforesaid which is readily adjustable as required to handle stacks in a substantial range of varying heights.

(8) A further object of the invention has been to provide apparatus as aforesaid which will be relatively free from small or complicated parts and which will accordingly be capable of long and reliable operation at relatively low maintenance costs.

Other objects of the invention will be apparent to persons acquainted with apparatus of the general type on reading the following description and inspecting the accompanying drawings.

In the drawings:

FIGURE 4 is a top view of said machine.

FIGURE 5 is a section taken on the line V—V of FIGURE 3.

FIGURE 8 is a section taken on the line VIII—VIII of FIGURE 2.

FIGURE 9 is a section taken on the line IX—IX of FIGURE 2.

FIGURE 10 is a section taken on the line X—X of FIGURE 2.

FIGURE 11 is a section taken on the line XI—XI of FIGURE 8.

FIGURE 14 is a section taken on the line XIV—XIV of FIGURE 6.

FIGURE 15 is a top view detail of one of the pawls.

FIGURE 16 is an oblique view of a pawl insert.

*General description*

In general the invention consists of providing a liftable platform for holding a stack, shuttle means operable for picking sheets one at a time from the top of said stack and control means for coordinating the lifting of said liftable platform with the feeding of sheets from the top of the stack in order to enable the shuttle to act in a single horizontal plane. By feeding from the top of the stack no appreciable weight is present to press the top sheet against the sheet next thereto and hence there exists very little likelihood of scratching therebetween. By using shuttle means, positive control is obtained over the sheet being moved and hence it is assured that only one sheet at a time will be moved from the stack. Further, by feeding from the top of the stack, the cost and complications of stack lifting means are avoided and the cost of maintenance thereof is minimized.

*Detailed description*

Figure 2:
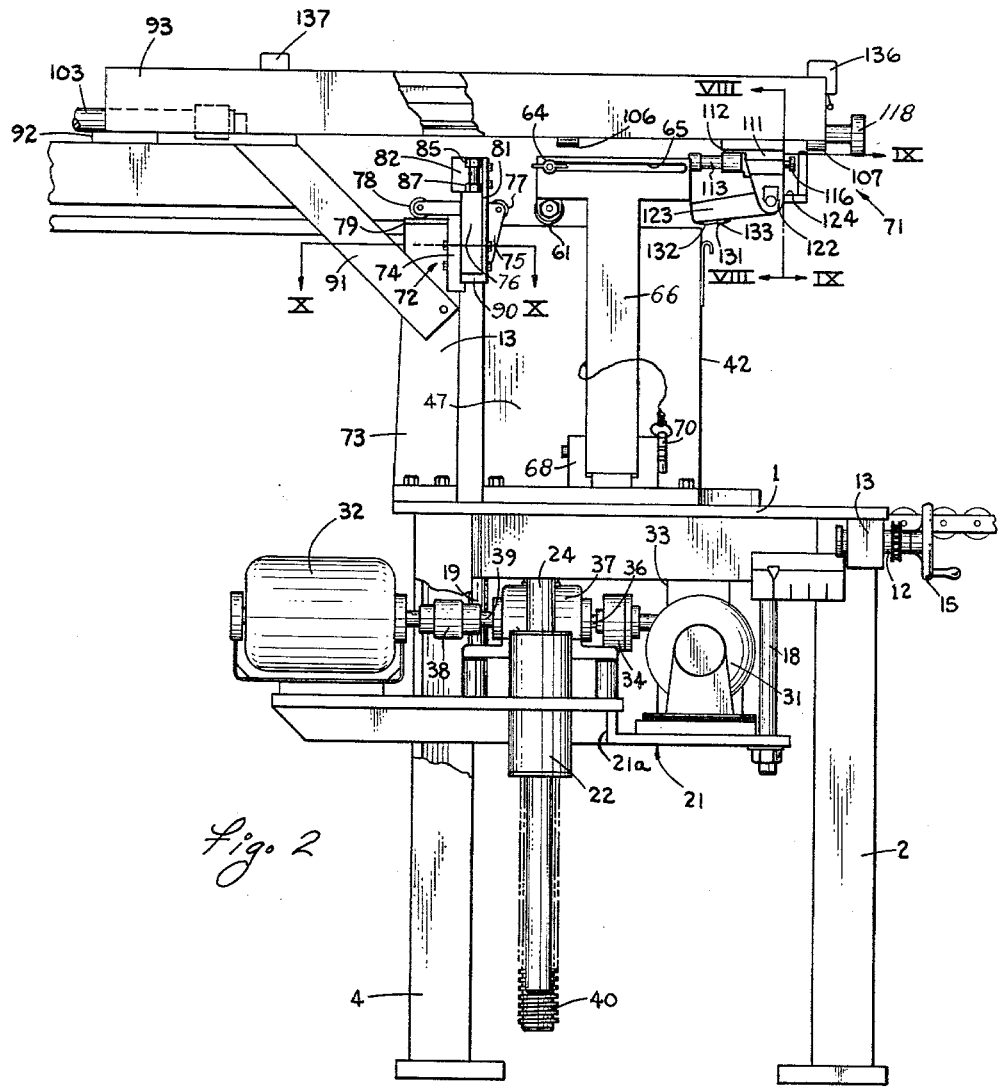
FIGURE 2 is a side elevational view showing the leftward side of the machine, taken in the direction of feeding of sheets therethrough.

In the following description, certain terminology will be utilized for ease in reference and such terminology will be recognized as for descriptive purposes only and not intended as limiting. For example, the terms "upward" and "downward" refer to directions taken with reference to the normal operating position of the machine. The terms "inward" and "outward" will refer to directions toward and away from the geometric center of the machine. The terms "rightward" and "leftward" will refer to directions taken with respect to the drawings with respect to which said terminology is used. The terms "forward" and "rearward" will refer to normal direction of material flow through said feeding means, "forward" being leftward as appearing in FIGURE 2.

The foregoing references to particular words include also derivatives of said words and words of similar import.

Figure 13:
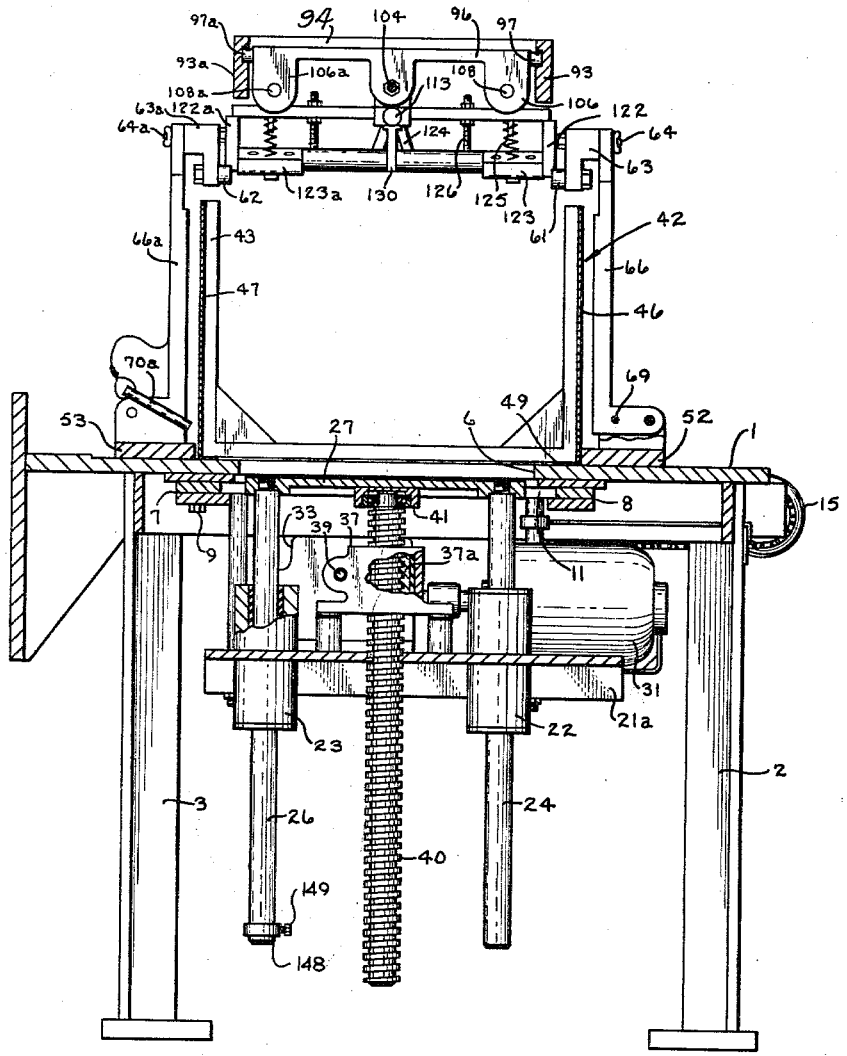
FIGURE 13 is a section taken on the line XIII—XIII of FIGURE 5.

Turning now to the drawings, the embodiment of the invention chosen to illustrate same includes a primary table 1 supported upon a plurality of legs 2, 3, 4 and 5. Said table has an elongated central opening 6 (FIGURE 5) therein for purposes appearing hereinafter. Arranged on either side of said opening are a pair of slideways 7 and 8 (FIGURE 13) which are held against the under side of table 1 by any convenient means, such as bolts of which one appears at 9. Within said slideways is carried a secondary table 11 which is slidable along said slideways and adjustable therealong by any convenient means, such as by the screw 12 (FIGURE 5) mounted in a block 13 depending from the primary table 1 and acting through a block 14 mounted on the secondary table 11. Said secondary table has an opening 16 therein for purposes appearing hereinafter.

Said secondary table 11 has depending therefrom a plurality of hanger rods of which three appear at 17, 18 and 19. Supported on and by said hanging rods is a platform 21, said platform 21 including a step 21a therein if desired for the purpose of more easily aligning the hereinafter described parts with respect to each other. Extending vertically through said platform 21 and rigidly connected thereto are a pair of bushings 22 and 23 through which slidably extend the guide rods 24 and 26. The upper ends of said guide rods support and are joined by a lift plate 27.

A lift motor 31 (FIGURE 2) is mounted on the platform 21 and the down motor 32 is also mounted on said platform. The lift motor acts through suitable speed reduction means 33 and a remotely operable clutch 34, such as a standard electric clutch, to drive the input shaft 36 of a gear box 37. The down motor 32 acts through the permanently connected coupling 38 to drive another input shaft 39 of the gear box 37. Said gear box 37 contains a worm gear 37a which acts against the worm screw 40 for lifting and lowering the lift plate 27, said worm screw 40 being connected through a flexible joint 41 to the lower side of said lift plate 27. Thus, with lift motor 31 continuously energized, opening and closing of the clutch 34 will act through the worm and worm screw combination to lift the lift plate 27 in increments controlled by the action of said clutch 34. During this time the down motor 32 is de-energized and is driven along with said worm mechanism. By opening the clutch 34 and energizing the motor 32, the worm may be driven at a high speed for rapidly lowering the lift plate 27.

Figure 1:
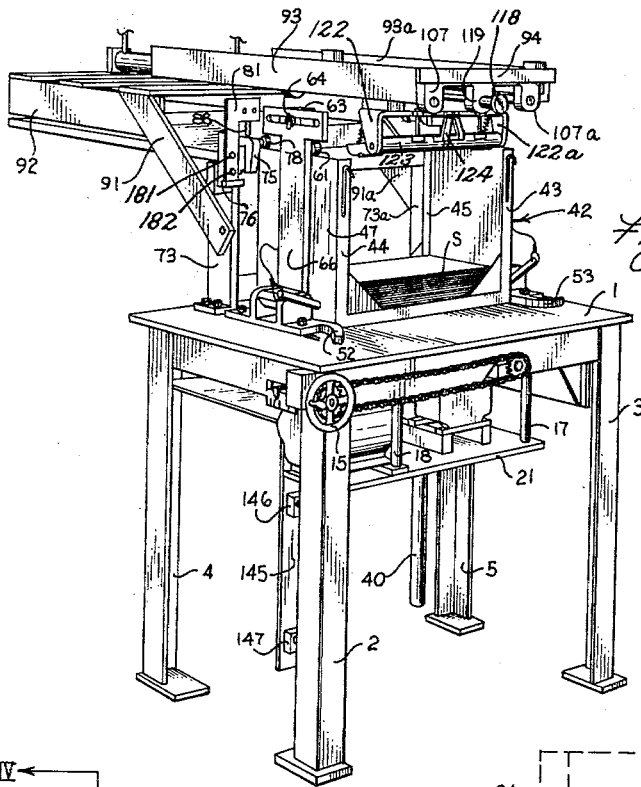
FIGURE 1 is an oblique view of a mechanism embodying the invention.
Figure 3:
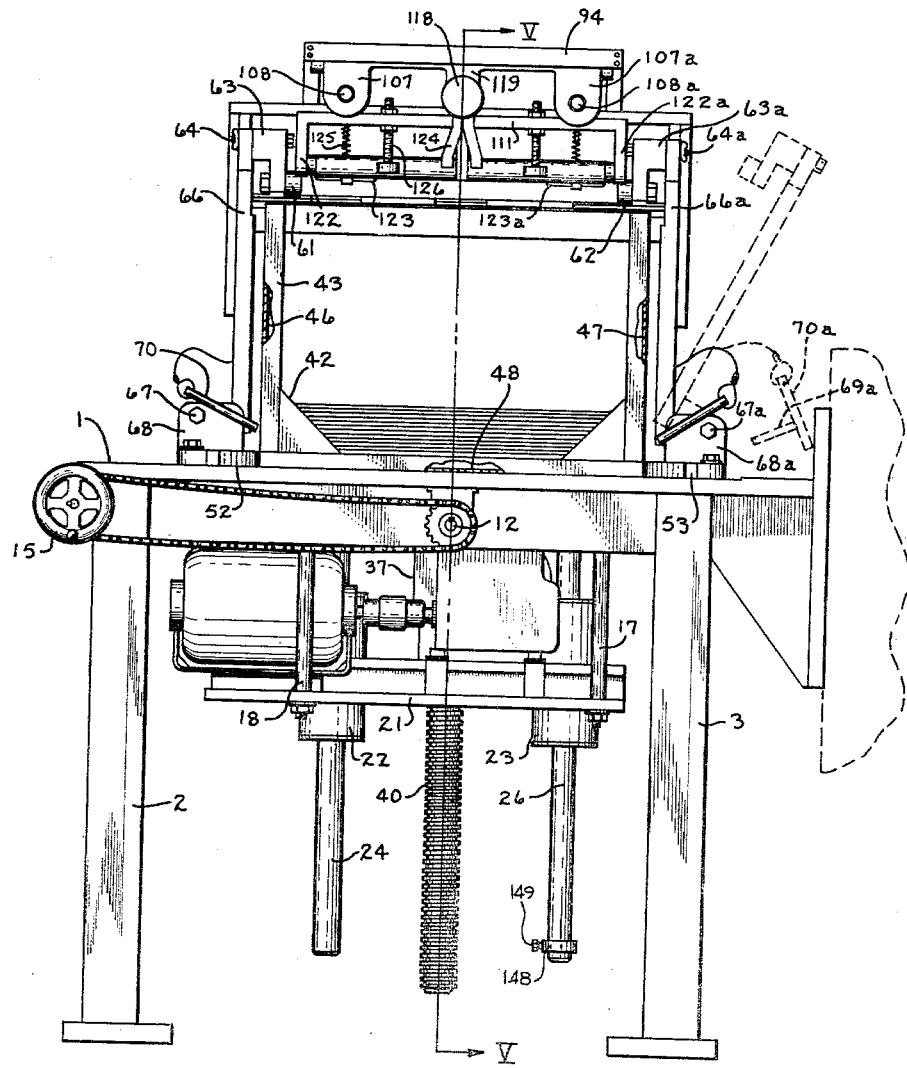
FIGURE 3 is an elevational view taken from the rear end of the machine looking in the direction of feeding.

Turning now to the stack holding and guiding means, this in this embodiment comprises a unitary and removable somewhat basket-like cartridge 42. This involves a box having four uprights of which three appear at 43, 44 and 45 together with side members 46 and 47 and a bottom member 48. Said bottom member 48 has an opening 49 through the bottom thereof for permitting passage therethrough of the lift plate 27. A block 51 fixed rigidly in the primary table 1 positively limits the leftward (FIGURE 5) movement of the cartridge 42 and thereby together with the side guides 52 and 53 (FIGURE 1) insures the exact positioning of said cartridge with respect to the remainder of the machine. Stack hold-down rollers 61 and 62 (FIGURE 3) are movably located immediately above a stack of sheets in the condition as further developed hereinafter. The roller 61 is rotatably mounted in a bracket 63 which is adjustably mounted by the screw 64 for forward and rearward adjustment through the slot 65 in the upper end of the pillar 66. Said pillar 66 is pivotally mounted at 67 to a pivot base 68 which in turn is rigidly affixed to the primary table 1. A removable pin 69 extends through the lower end of the pillar 66 and also through the base 68 to hold said pillar fixedly in place. A bar 70 may be provided for ease in withdrawing the pin 69 if desired.

The stack hold-down roller 62 is mounted identically with the stack hold-down roller 61 and hence needs no description specifically directed thereto. The same numerals are applied to mounting means for the hold-down roller 62 and identified by the subscript "a" and corresponding to the numerals used with reference to the hold-down roller 61. A retracted position thereof is shown in broken lines in FIGURE 3.

Turning now to the shuttle means 71 and the stack control means 72, it will be understood that said shuttle means 71 operates to move a preselected number of sheets, usually one sheet, at a time from the top of a stack held within the cartridge 42 and the stack control means 72 operates to insure that only said preselected number of sheets at a time is so moved.

Turning first to the stack control means 72, there is provided a pair of upstanding pillars 73 and 73a (FIGURES 1 and 5) at the extreme forward end of the machine and mounted on and rigidly with respect to the primary table 1.

Figure 6:
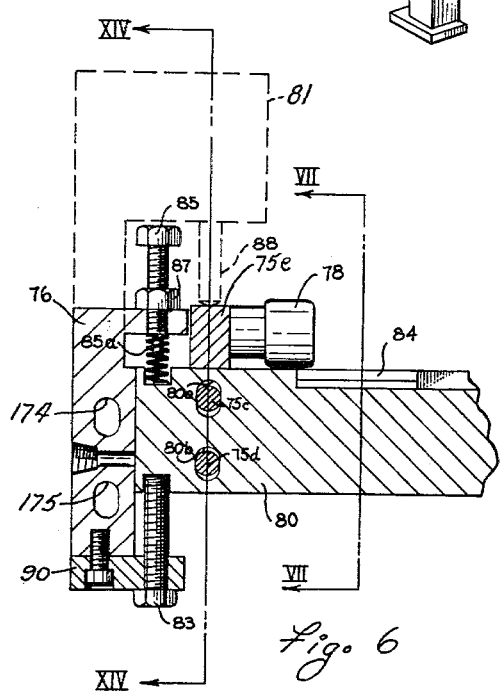
FIGURE 6 is a section taken on the line VI—VI of FIGURE 4.
Figure 7:
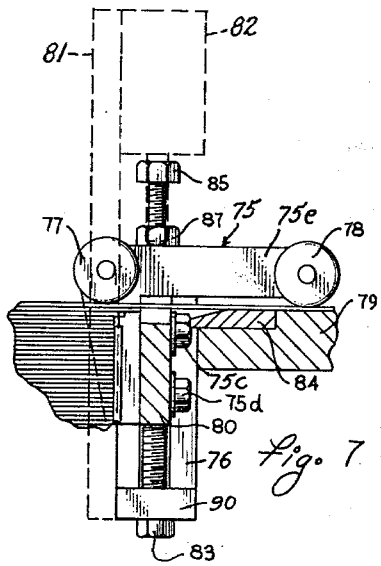
FIGURE 7 is a section taken on the line VII—VII of FIGURE 6.

The pillar 73 carries at its upper end a block 74 to which is mounted a control base 76 which in turn supports a mounting block 90 and the switch bracket 81 upon which is mounted a switch 82. The switch bracket 81 is adjustably secured to the control base 76 by means of bolts 181 and 182 passing through the vertically elongated holes 174 and 175 (FIGURE 6) in the control base 76 and through coaxial holes in the block 74, one thereof appearing at 184 (FIGURE 10). The pillars 73 and 73a also have extending across the upper ends thereof a guide platform 79 for the support and guidance of a sheet being fed from the machine. A knife bar 80 is vertically slidably supported in the slot 76a of the control base 76. Its position is adjustably determined by the bolts 83 and 85, together with the spring 85a, which arrangement permits upward movement from a predetermined position but not downward. A wear plate 84 of hardened material is carried on the guide platform 79 to further assist in supporting the top sheet to be fed from the remainder of the stack.

Guide rollers 77 and 78 are mounted on the horizontal leg 75e of an L-shaped bracket 75 whose vertical leg 75b is mounted by screws 75c and 75d, extending through slots 80a and 80b which are vertically elongated for adjustment purposes, onto the vertically movable knife bar 80 for vertical movement therewith. By suitable relative adjustment between the upper edge of said knife bar 80 and the lower extremities of said rollers 77 and 78 and their counterparts 77a and 78a, further mentioned hereinafter, on the opposite side of the machine, a precise space is defined through which a predetermined number of sheets, usually only a single sheet, can pass from the top of the stack to the discharge portion of the apparatus.

The depending actuator 88 of the switch 82 is located directly above the horizontal leg 75e of said L-shaped bracket 75 so that upward movement thereof will move said switch to a position, such as a closed position, for opening the clutch 34 and downward movement thereof will move said switch to the position for engaging said clutch 34. The height of the bracket 75 at which the switch 82 is actuated is controlled by adjustment of the position of the switch bracket 81 on the control base 76 which is here accomplished by vertical movement of bolts 181 and 182 in elongated holes 174 and 175 in the control base 76 and in concentric holes, one of which is indicated at 184 in the block 74.

A similar pair of guide rollers 77a and 78a are mounted on the opposite side of the machine and are supported on the pillar 73a in the same manner as above described in connection with the rollers 77 and 78 and the pillar 73. However, there will normally only be required one switch and hence there is no structure corresponding to the switch 82 or its supporting bracket associated with the pillar 73a.

Turning now to the shuttle mechanism, attention is first directed toward the means for mounting same. This will in the present embodiment be described as rigidly mounted thereto, although in some instances it will be found more convenient to mount same on the means with which the feeding structure of the invention is used provided only it results in a mounting of the shuttle frame means rigidly with respect to the primary table 1 in the same manner as the mechanism hereinafter specifically described.

Extending upwardly and forwardly and rigidly affixed to the pillars 73 and 73a are braces 91 and 91a which rigidly support a platform 92. A pair of rails 93 and 93a are affixedly mounted on said table 92 and extend rearwardly to a point substantially over the rearward edge of the primary table 1. A strengthening brace 94 connects the rearward ends of said rails to help to rigidify same. A shuttle carrier 96 is supported for forward and rearward reciprocation upon the four rollers 97, 98, and 97a, 98a which operate within the slots 99 and 99a respectively. Further, rollers 101, 101a, 102 and 102a are provided as desired to limit lateral movement of the shuttle carrier 96. A pressure fluid actuated cylinder 103 is mounted rigidly upon the platform 92 and is suitably connected by a rod 104 to the shuttle carrier 96 for reciprocable actuation of same.

Depending below the shuttle carrier 96 are four rod hangers 106, 106, 107 and 107a which receive and support rigidly with respect to the shuttle carrier a pair of rods 108 and 108a in a position parallel with respect to the rails 93 and 93a.

A shuttle bracket 111 has upstanding hangers 112 and 112a which are slidably arranged upon said rods 108 and 108a respectively. A small pressure cylinder 113 is fixedly mounted on and below the shuttle bracket 111 and has a rod 114 extending rearwardly and slidably through a center hanger 130 and terminating in a push pad 116. A shuttle adjusting rod 117 operable by any convenient means, such as the knob 118, is mounted for rotation but held against axial movement in a depending hanger 119 and threadedly engages an upstanding block 121 rigidly carried on and by the shuttle bracket 111. Thus, rotation of said knob will effect forward and rearward movement of said shuttle bracket 111 on the rods 108 and 108a and with respect to the shuttle carrier 96.

Shuttle hangers 122 and 122a depend from opposite ends of the shuttle bracket 111 and pivotally carry at their lower ends in cooperation with the center hanger 130 the shuttles 123 and 123a. Each of said shuttles has a rearwardly and upwardly extending L-shaped operator 124 and 124a respectively, the upper ends of which are adjacent each other to provide a push zone against which the pad 116 bears. Thus, energizing of the cylinder 113 moves the pad 116 rearwardly (rightwardly as seen in FIGURE 5) and acts through the L-shaped operators 124 and 124a to lift the shuttles 123 and 123a upwardly. The deenergizing of the cylinder 113 permits a return spring therein to move said pad 116 forwardly and thereby permit the forward ends of the shuttles 123 and 123a to drop downwardly, assisted, if desired by springs 125 and 125a (FIGURE 11) whose effect is limited by the adjustable abutment provided by the screws 126 and 126a. A notch 131 is provided in the shuttle 123 and a corresponding notch 131a is provided in the shuttle 123a for engaging the sheet material which it is the purpose of the machine to feed. Said notches 131 and 131a are preferably provided by the depending tooth portions of a pair of replaceable inserts 132 and 133 which will preferably be of hardened and wear resistant material but which are also replaceable to select as desired the depth of said notch 131. Thus, by appropriate selection of the inserts 132 and 133, the shuttles 123 and 123a can be used to feed one sheet, or more than one sheet, at a time.

Figure 12:
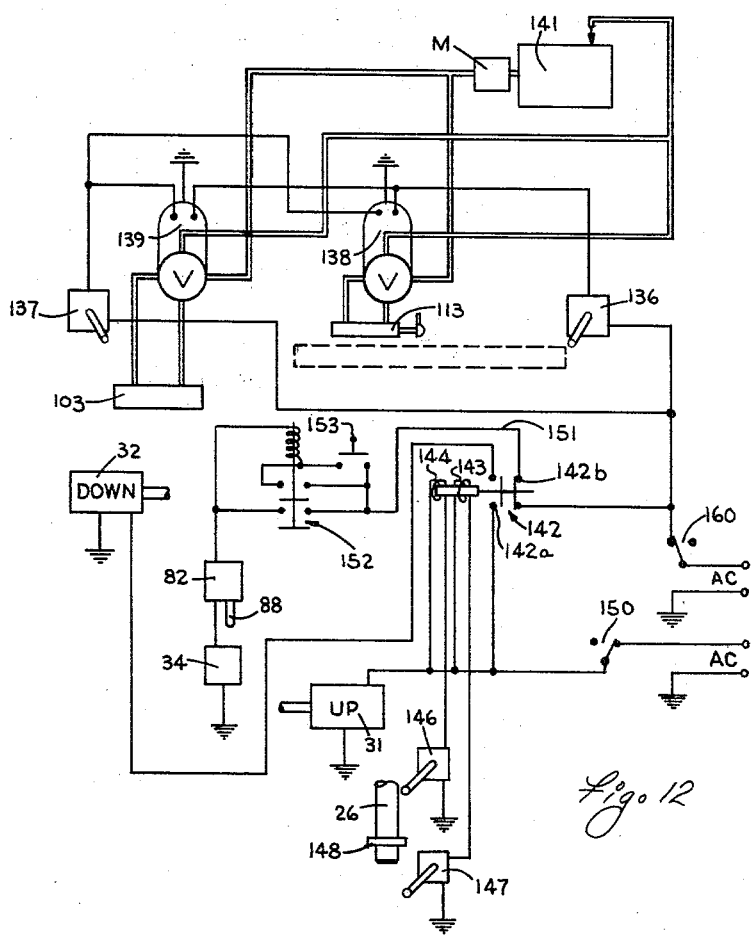
FIGURE 12 is a diagrammatic representation of the hydraulic and electrical control connections.

Any suitable means may be provided for actuating the pressure cylinders 103 and 113, such as micro switches 136 and 137 operating pressure fluid valves 138 and 139 (FIGURE 12) which in turn connect the source 141 of pressure fluid to said cylinders 103 and 113. The connections are such that when the switch 136 is actuated upon the shuttle carrier 96 reaching its rearward position the cylinder 103 is energized to move the shuttle carrier forwardly and the cylinder 113 is de-energized to move the shuttles downwardly. When the shuttle carrier 96 reaches its forward position the micro switch 137 is actuated to reverse the fluid flow into the cylinder 103 whereby to return the shuttle carrier rearwardly and the cylinder 113 is energized to move the shuttles 123 and 123a upwardly.

A return switch 142 is provided for simultaneously energizing the down motor 32 and de-energizing and opening the clutch 34 to return the lift plate 27 to its lower, or starting position. This switch 142 may be manually actuated, if desired, or it may be actuated by any suitable automatic means, responsive to the vertical position of the lift. For example, the switch 142 may be movable to one position or the other in response to the energizing of one or the other of the solenoids 143 and 144. These are respectively energized from a suitable source by switches 146 and 147 mounted on a suitable bracket 145 (FIGURE 1) on the frame of the machine, arranged alongside of the guide rod 26 and operated by a collar 148 on said guide rod. Said collar is preferably held for adjustment purposes adjustably along the rod 26 by any convenient means such as a set screw 149.

Operation

Operation of the machine is started with the lift plate 27 in its full downward position and, preferably, with the shuttle carrier 96 in its full rearward position. The side pillars 66 and 66a are moved outwardly as indicated by broken lines in FIGURE 3. A cartridge 42 carrying a suitable supply of sheet material to be fed is then moved from the rearward edge of the table 1 between the side guides 52 and 53 forwardly against the forward limit block 51. The side pillars 66 and 66a are now moved back inwardly and locked by pins 69 and 69a into their normal position as shown in solid lines in FIGURE 3. The brackets 75 and 75a are adjusted on the bar 80 so that only a designated number of sheets, usually one, at a time can be fed between the rollers 77 and 77a and knife bar 80. The switch bracket 81 is adjusted on the control base 76 by means of the bolts 181 and 182 and holes 174 and 175 so that the limit switch 82 is actuated to disengage the lift means as hereinbelow described. The lower vertical limiting position of the bar 80 is adjusted with respect to the machine frame by means of the bolt 83 so that the roller 78 in its lower limiting position will be adjacent the upper surface of the guide platform 79 whereby the rollers 77 and 78 (and their counterparts 77a and 78a) may assume their lowermost positions without risk of damage to themselves or to the stack of sheets or the guide platform 79. The electrical system is energized by closing the switches 150 and 160 and depressing the button 153. Since the upper edge of the stack is not at this moment against the guide rollers 77 and 77a and assuming the switch 142 to be in the position shown in FIGURE 12, the clutch 34 will be closed and the worm nut 37a will be operated by the motor 31 to drive the screw 40 upwardly, resulting in upward movement of the lift plate 27. Said lift plate 27 first extends through the opening 6 in the primary table 1 and then through the opening 49 in the bottom of the cartridge 42 until it comes against the lower end of the stack S of sheets to be fed. Said lift plate 27 then lifts said stack upwardly until the upper end thereof bears against the rollers 61 and 62 and also bears against the rollers 77 and 77a. This lifts said rollers resulting in a lifting of the L-shaped brackets 75 and 75a and the bracket 75 acts against the switch actuator 88. When said switch actuator is lifted a predetermined distance, the switch 82 is actuated in a manner to open the clutch 34 and upward movement of the stack S ceases. The vertical position of rollers 77, 78, 77a and 78a will be chosen with respect to the lowermost surface of the rollers 61 and 62 so that any upward curl on the ends of the sheets comprising the stack S will be removed and the sheets will lie substantially planar and horizontally, but without excessive or unnecessary upward pressure on said rollers 61 and 62, at the moment the upper surface of said stack contacts the rollers 77 and 77a and actuates the switch 82.

The pressure fluid circuit including the cylinders 103 and 113 may now be energized in any suitable manner, such as by opening a master valve M (FIGURE 12) and energizing the electric circuitry including the limit switches 136 and 137 and the electrically controlled valves 138 and 139 associated therewith. With the shuttle carrier 96 in its full rearward position, and the switch 136 thereby actuated, the cylinder 113 is de-energized and the shuttles 123 and 123a move downwardly in response to gravity and to the urging of spring 125 if same is used. Their downward movement is limited by the screw 126 suitably adjusted with respect to the upper end of the stack and hence, assuming the sheets are to be fed only one at a time, the notch 131 is in a position to engage the upper sheet but only the upper sheet of said stack when the shuttle carrier 96 moves forwardly. Simultaneouly the cylinder 103 is energized to effect forward movement of the shuttle carrier.

As the shuttle carrier moves forwardly and the upper sheet is engaged and urged forwardly by the shuttles, the sheets next below said uppermost sheet will bear against the inner edge of the bar 80 and be held thereby against further forward movement. The rollers 77 and 78, and their counterparts 77a and 78a on the opposite side of the machine, will hold the edges of the upper sheet down closely against the platform 79 while said shuttles continue to urge said uppermost sheet forwardly. Said sheet is then received into whatever means are provided for receiving same, such as means by which said sheet is carried on to further processing means.

When the shuttle carrier strikes the switch 137, the fluid flow to the cylinder 103 is reversed and the shuttle carrier 96 returns rearwardly. Simultaneously the cylinder 113 is energized and the shuttle 123 thereby lifted during the return stroke of the shuttle carrier. By thus lifting said shuttle, it does not drag against and scratch the next uppermost sheet of the stack.

With the movement of the just-fed upper sheet out from under the last guide rollers 78 and 78a, the L-shaped brackets react to the spring and move downwardly. This again actuates the switch 82 for closing the clutch 34 and this connects the constantly moving motor 31 through the worm 37a to the worm screw 40 and thereby moves the lift plate 27 upwardly until the then uppermost sheet of the stack again contacts the guide rollers 77 and 77a and again actuates said switch 82 for opening the clutch 34. By this time the shuttle carrier 96 has again reached its most rearward position where it again contacts the switch 136 and the cycle repeats.

When the stack has been completely fed out, the down motor 32 will be energized, in this embodiment by the contacts 142a of the switch 142, and it operates the screw 40 at a high speed to return the lift plate 27 downwardly for the removal of the empty cartridge 42 and the reception of a new one properly supplied with more sheets to be fed out. Inasmuch as after the last sheet has been fed from a given cartridge, the switch actuator 88 will be in its lower position and the clutch 34 thereby closed, means must be provided in association with the switch by which the down motor 32 is energized, here the switch 142 for simultaneously de-energizing and thereby opening the clutch 34 and such provision is made in this embodiment by the contacts 142b of the switch 142.

While the switch 142 may be operated manually if desired, where the automatic control features including the switches 146 and 147 are used, the collar 148 and said last-named switches will be arranged so that the switch 146 is actuated when the lift 27 is at a point slightly above the level at which it feeds the last sheet. Thus, when the last sheet is fed out, the switch 82 closes in the usual manner and the lift again moves upwardly. In so doing, the collar 148 actuates the switch 146 which energizes the solenoid 144 and moves the switch 142 to its leftward (as appearing in FIGURE 12) position. This energizes the down motor 32 and de-energizes the clutch 34. When the lift reaches the lowermost position (the position shown in the drawings) the collar 148 will actuate the switch 147 and the switch 142 will be returned to its FIGURE 12 position which de-energizes the motor 32. In the meantime, however, the de-energizing of the line 151 by the opening of contacts 142b causes the switch 152 to open. Hence, the return of the lift to its lower position will not yet energize the clutch 34 to start it upward again. The empty basket 42 may now be removed, a new one provided and the button 153 again depressed to start a new cycle.

When it is desired to change the size of the sheets being handled, assuming for example that the sheets now to be handled are somewhat narrower than those first handled, the knob 118 is rotated for moving the shuttle bracket 111 forwardly until it is again in proper position with respect to the rearward edge of the sheets for engagement immediately upon forward movement of said shuttle. Similarly the screw 12 will be rotated, such as by rotation of the wheel 15, to move the entire secondary table and lift plate 27 carried thereby forwardly or rearwardly with respect to the opening 6 in the primary table 1 in order that the lift plate 27 will engage the middle of the new stack. No further adjustments are required.

While in the foregoing it has been assumed that the sheets would be fed one at a time from said stack, it will be recognized that by suitable adjustment of the width of the notch 131 of the shuttle and the height of the switch 82 above the platform 79, it will be easy to feed two or more sheets at a time from the top of the stack if and as desired.

Although a particular embodiment of the invention has been described above in detail for illustrative purposes, it will be recognized that variations or modifications of such disclosure, which lie within the scope of the appended claims, are fully contemplated.

What is claimed is:

1. In a machine for feeding successive and equal thicknesses of sheets from a stack thereof, the combination comprising: frame structure; stop means vertically slidably mounted on said frame structure for limiting forward movement of all of said stack excepting the topmost of said thicknesses; follower means normally resting on the top of said stack and adjustably secured to said stop means to define a gap therebetween substantially equal to said thickness whereby said thickness may be admitted therethrough and greater thicknesses are not admittable therethrough; switch means actuatable by vertical movement of said follower means; lift means controlled by said switch means for lifting said stack; reciprocable shuttle means for engaging said topmost thickness and moving same through said gap and off said stack; whereby said follower means drops to the level of the next one of said thicknesses of said sheets to actuate said switch means and raise the top of said stack to its previous level whereat said follower means actuates said switch means to stop said lift means.

2. In a sheet destacking machine, the combination comprising: a frame, generally horizontal elongated stop means vertically slidable on said frame and adjacent and generally parallel to a face of a stack of sheets; follower means normally riding on a topmost sheet of said stack and adjustably secured to said stop means and spaced therefrom to define a gap for allowing passage of a predetermined number of sheets therethrough; lift means for lifting said stack and responsive to the vertical position of said follower means whereby downward movement of said follower means from a predetermined position energizes said lift means whereby said lift means are de-energized when said follower means is returned to said predetermined position by the upward movement of said stack.

3. In a machine for feeding successive groups of sheets, the combination comprising:
   a substantially horizontal table;
   block means on said table defining a rectangular area;
   means defining an opening through said table in said rectangular area;
   vertically actuatable lift means located below said table and capable of rising through said opening therein;
   a substantially rectangular cartridge removably located in said area having at least an open upper end and an opening in the bottom thereof in registry with said opening in said table, said cartridge containing a stack of substantially horizontal sheets for lifting by said lift means;
   a pair of normally upstanding pillars pivotally mounted with respect to said table adjacent to and on opposite sides of said cartridge and for pivotal movement away from said stack, and means for locking said pillars in a substantially upstanding position and stack hold down means at the upper ends of said pillars for preventing upward movement of the top sheet of said stack beyond a predetermined level;
   whereby pivotal movement of said pillars away from each other and lowering of said lift means below the top of said table allows replacement of said cartridge.

4. In a machine for feeding sheets from the top of a stack of sheets, the combination comprising:
   frame structure including limiting means located adjacent the forward end of the stack for limiting the forward movement of all of said stack excepting a selected number of sheets on the top of said stack and for allowing said selected number of sheets to be moved forwardly therepast;
   energizable and de-energizable lift means for lifting said stack and switch means responsive to the vertical position of the uppermost sheet on said stack for energizing and de-energizing said lift means, said switch means operating in such a manner that when the top surface of said stack is below a first predetermined level said lift means are energized and when it reaches said first predetermined level said lift means are de-energized;
   a shuttle carrier movably mounted with respect to said frame structure above said stack for movement across the top of said stack and a reciprocable shuttle pivotally mounted with respect to said shuttle carrier for engaging said selected number of sheets and moving them completely off the top of said stack;
   a fluid pressure cylinder and means connecting said cylinder to said shuttle such that said shuttle will occupy an upper or lower position with respect to said frame structure in response to an energized or de-energized condition of said cylinder.

5. In a machine for feeding sheets from the top of a stack of sheets, the combination comprising:
   frame structure including limiting means located adjacent the forward end of the stack for limiting the forward movement of all of said stack excepting a selected number of sheets on the top of said stack and for allowing said selected number of sheets to be moved forwardly therepast;
   energizable and de-energizable lift means for lifting said stack and switch means responsive to the vertical position of the uppermost sheet on said stack for energizing and de-energizing said lift means, said switch means operating in such a manner that when the top surface of said stack is below a first predetermined level said lift means are energized and when it reaches said first predetermined level said lift means are de-energized;

a shuttle carrier movably mounted with respect to said frame structure above said stack for movement across the top of said stack and a reciprocable shuttle pivotally mounted with respect to said shuttle carrier for engaging said selected number of sheets and moving them completely off the top of said stack;

a fluid pressure cylinder and means connecting said cylinder to said shuttle such that said shuttle will occupy an upper or lower position with respect to said frame structure in response to an energized or de-energized condition of said cylinder;

means responsive to the position of said shuttle carrier for effecting the energizing and de-energizing of said cylinder.

6. In a machine for feeding sheets from the top of a stack of sheets, the combination comprising:

frame structure including limiting means located adjacent the forward end of the stack for limiting the forward movement of all of said stack excepting a selected number of sheets on the top of said stack and for allowing said selected number of sheets to be moved forwardly therepast;

energizable and de-energizable lift means for lifting said stack and switch means responsive to the vertical position of the uppermost sheet on said stack for energizing and de-energizing said lift means, said switch means operating in such a manner that when the top surface of said stack is below a first predetermined level said lift means are energized and when it reaches said first predetermined level said lift means are de-energized;

a shuttle carrier mounted for reciprocation forwardly and rearwardly with respect to said frame structure and above said stack;

a shuttle and guide means on said shuttle carrier for slideably supporting said shuttle thereon for movement forwardly and rearwardly with respect thereto;

adjustment means connected between said shuttle and shuttle carrier for adjustably fixing the forward-rearward location of said shuttle on said guide means;

whereby said shuttle is capable of engaging said selected number of sheets and moving them completely off of the top of said stack, manipulation of said adjustment means varying the distance that said topmost number of sheets is moved by said shuttle.

7. In a machine for feeding sheets from the top of a stack of sheets, the combination comprising:

frame structure including limiting means located adjacent the forward end of the stack for limiting the forward movement of all of said stack excepting a selected number of sheets on the top of said stack and for allowing said selected number of sheets to be moved forwardly therepast;

energizable and de-energizable lift means for lifting said stack; and switch means responsive to the vertical position of the uppermost sheet on said stack for energizing and de-energizing said lift means, said switch means operating in such a manner that when the top surface of said stack is below a first predetermined level said lift means are de-energized;

a reciprocable shuttle movably mounted with respect to said frame structure above said stack for movement across the top of said stack for engaging said selected number of sheets and moving them completely off of the top of said stack;

wherein said lift means is intermittently actuable through a clutch from a continuously rotating motor, said switch means being connected to open and close said clutch, respectively, as the upper end of said stack moves upwardly into its uppermost position and drops therefrom due to removal of sheets therefrom.

8. In a machine for feeding sheets from the top of a stack of sheets, the combination comprising:

frame structure including limiting means located adjacent the forward end of the stack for limiting the forward movement of all of said stack excepting a selected number of sheets on the top of said stack and for allowing said selected number of sheets to be moved forwardly therepast;

energizable and de-energizable lift means for lifting said stack; and switch means responsive to the vertical position of the uppermost sheet on said stack for energizing and de-energizing said lift means, said switch means operating in such a manner that when the top surface of said stack is below a first predetermined level said lift means are de-energized;

a reciprocable shuttle movably mounted with respect to said frame structure above said stack for movement across the top of said stack for engaging said selected number of sheets and moving them completely off of the top of said stack;

a platform movable forwardly and rearwardly on and with respect to said frame structure;

means including a motor mounted on said platform;

means including worm means threadedly supported on said platform and a lift plate constituting said lift means supported by said worm means, a clutch connected to said motor and means for driving said worm means through said clutch whereby upon energizing of said motor and closing of said clutch, said lift means will be lifted;

means for manually effecting adjustment of said platform forwardly and rearwardly with respect to said frame structure.

9. In a machine for feeding sheets from the top of a stack of sheets, the combination comprising:

frame structure including limiting means located adjacent the forward end of the stack for limiting the forward movement of all of said stack excepting a selected number of sheets on the top of said stack and for allowing said selected number of sheets to be moved forwardly therepast;

energizable and de-energizable lift means for lifting said stack; and switch means responsive to the vertical position of the uppermost sheet on said stack for energizing and de-energizing said lift means, said switch means operating in such a manner that when the top surface of said stack is below a first predetermined level said lift means are de-energized;

a reciprocable shuttle movably mounted with respect to said frame structure above said stack for movement across the top of said stack for engaging said selected number of sheets and moving them completely off of the top of said stack;

wherein said limiting means includes vertically slideable bar means, a plurality of rollers and roller support means secured to said bar means for rotatably supporting said rollers, said rollers and said bar means defining a vertical gap therebetween whereby only a thickness of said sheets equal to or less than said gap may pass through said gap, said gap thereby being movable with said bar without changing the gap size.

10. In a machine for feeding sheets from the top of a stack of sheets, the combination comprising:

frame structure including limiting means located adjacent the forward end of the stack for limiting the forward movement of all of said stack excepting a selected number of sheets on the top of said stack and for allowing said selected number of sheets to be moved forwardly therepast;

energizable and de-energizable lift means for lifting said stack; and switch means responsive to the vertical position of the uppermost sheet on said stack for energizing and de-energizing said lift means, said switch means operating in such a manner that when the top surface of said stack is below a first predetermined level said lift means are de-energized;

a reciprocable shuttle movably mounted with respect to said frame structure above said stack for movement across the top of said stack for engaging said selected number of sheets and moving them completely off of the top of said stack;

a first motor which is normally continuously energized and a clutch intermittantly actuable by said switch means to connect said first motor to said lift means for raising said stack;

a second motor and means for connecting said second motor to said lift means and further switch means actuable upon said lift means reaching a predetermined maximum height to de-energize said first motor and energize said second motor for lowering said lift means to a predetermined minimum height.

11. In a sheet destacking machine, the combination comprising:

a frame, generally horizontal elongated stop means vartically slideable on said frame and adjacent and generally parallel to a face of a stack of sheets;

follower means normally riding on the topmost sheet remaining on said stack and adjustably fixed to said stop means so that said stop means move vertically with said follower means, said follower means being spaced from said stop means to define a gap for allowing passage of a predetermined number of sheets therethrough, said follower means, gap and stop means dropping together as said predetermined number of sheets on the top of the stack are removed therefrom;

lift means for lifting said stack and responsive to the vertical position of said follower means whereby downward movement of said follower means from a predetermined position energizes said lift means and whereby said lift means are de-energized when said follower means is returned to said predetermined position by the upward movement of said stack;

wherein said follower means includes:

a pair of substantially similar, L-shaped members rigidly secured to opposite ends of said stop means and beyond but adjacent the edges of said sheets, said L-shaped members having substantially parallel legs extending horizontally away from said stack;

first rollers on the opposed faces of said horizontal legs and located over said stack and second rollers on said opposed faces of said legs and located outwardly of said stack, the bottom faces of said rollers being at the same horizontal level, said first rollers normally resting on the topmost sheet of said stack;

and including a fixed horizontal platform horizontally spaced from said stack by said stop means and located below the top of said stack for receiving sheets therefrom;

whereby a group of sheets moved from the top of said stack to said platform will no longer support said first rollers but will support said second rollers so that said follower means will not drop from said predetermined position until said group of sheets is removed from beneath both said first and second rollers.

References Cited by the Examiner

UNITED STATES PATENTS

| | | |
|---|---|---|
| 1,929,340 | 10/33 | Wagner. |
| 2,076,186 | 4/37 | Reynolds. |
| 2,086,138 | 7/37 | Roque _____ 271—42 |
| 2,324,523 | 7/43 | Lund. |
| 2,449,395 | 9/48 | Lakso. |
| 2,467,493 | 4/49 | Pobich. |
| 2,774,489 | 12/56 | Guigas. |
| 2,921,788 | 1/60 | Lawrence. |
| 2,954,881 | 10/60 | Hopton. |
| 2,988,236 | 6/61 | Shields _____ 214—8.5 X |
| 3,035,835 | 5/62 | Reif. |
| 3,067,885 | 12/62 | Kohler. |
| 3,104,100 | 9/63 | Watts. |

HUGO O. SCHULZ, *Primary Examiner.*

MORRIS TEMIN, *Examiner.*